United States Patent

[11] 3,604,827

| | | | | |
|---|---|---|---|---|
| [72] | Inventors | Milton P. Albert;<br>Milton J. Scott, both of St. Louis, Mo. | | |
| [21] | Appl. No. | 878,213 | | |
| [22] | Filed | Nov. 19, 1969 | | |
| [45] | Patented | Sept. 14, 1971 | | |
| [73] | Assignee | Monsanto Company<br>St. Louis, Mo. | | |

[54] ELECTRODE FOR USE IN MANUFACTURING ELEMENTAL PHOSPHORUS
1 Claim, 2 Drawing Figs.

[52] U.S. Cl. ................................................. 13/18
[51] Int. Cl. ................................................. H05b 7/06
[50] Field of Search ........................................... 13/9, 18, 34, 31

[56] References Cited
UNITED STATES PATENTS
| 2,800,396 | 7/1957 | Udy | 13/34 X |
| 2,862,792 | 12/1958 | Rehm | 13/34 X |

Primary Examiner—Bernard A. Gilheany
Assistant Examiner—R. N. Envall, Jr.
Attorneys—Herbert B. Roberts, Roger R. Jones, Thomas N. Wallin and Neal E. Willis ABSTRACT: Improved amorphous carbon electrodes characterized by sonic propagation velocities of from 5,000 to 5,900 ft./sec. exhibit improved performance in electric furnace processes for manufacture of elemental phosphorus.

PATENTED SEP 14 1971

3,604,827

INVENTORS
MILTON P. ALBERT
MILTON J. SCOTT
BY
*Thomas N. Wallin*
ATTORNEY

ELECTRODE FOR USE IN MANUFACTURING ELEMENTAL PHOSPHORUS

BACKGROUND OF THE INVENTION

This invention relates to improved electrodes suitable for use in electric furnace processes for the manufacture of element phosphorus.

As is well known to those skilled in the art, essentially all elemental phosphorus is now industrially produced by electric furnace reduction of phosphatic raw materials in the presence of silica and carbon (principally supplied in the form of coke or calcined anthracite coal). Processes of this type are described, for example, in Vol. II, *Phosphorus and its Compounds*, edited by John R. Van Wazer, Interscience Publishers Inc. 1961. In these processes, electrical arcs between the tips of large electrodes (40 inches or more in diameter) and the furnace floor provide thermal energy for reducing the phosphatic feed stock to elemental phosphorus and vaporizing the phosphorus from the furnace for condensation and collection.

Breakage of electrodes utilized in such processes constitute a major practical problem. Such breakage occurs primarily in the lower regions of the furnace where high thermal stresses are encountered and results in the electrode tip being positioned at a higher level within the furnace. (The broken electrode section falling to the furnace floor effectively raises the floor height at that point. Thus, the overall effect is to raise the height of the electric arc in the furnace). The higher tip position results in increased temperature of off-gases which now pass upwardly a reduced distance through the bed of the cooler feed stock which is continuously moving downward. In order to prevent damage to the furnace, and other deleterious effects, it is necessary to reduce the temperatures of off-gases resulting from the higher electrode tip position by reducing the electrical power input or by other costly means which lower the yield of phosphorus and thereby increase cost of production.

It is thus apparent that electrodes for electric furnace processes having improved resistance to breakage would constitute a significant advancement in the art of producing elemental phosphorus.

SUMMARY OF THE INVENTION

It is an object of this invention to provide electrodes for use in electric furnace processes for the manufacture of elemental phosphorus which are characterized by improved resistance to breakage. These improved electrodes are amorphous carbon electrodes comprising a plurality of longitudinally contiguous sections having diameters of at least 40 inches and characterized by sonic propagation velocities of from 5,000 to 5,900 ft./sec.

DESCRIPTION OF THE PREFERRED EMBODIMENTS

Figure 1:
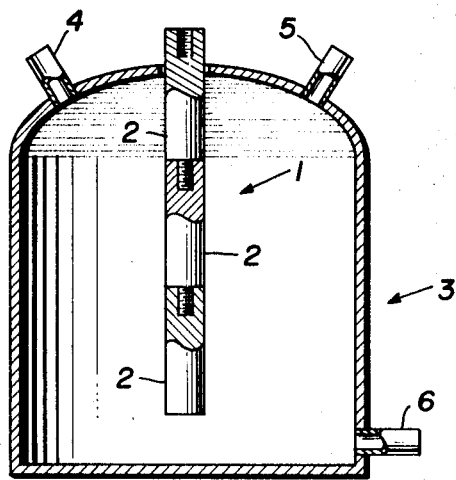
FIG. 1 is a representation, partly in section, of an electric furnace such as conventionally used in the manufacture of elemental phosphorus. As shown, an electrode 1 is positioned in the furnace 3 and held in place through the roof of the furnace by electrical contact and support means not shown. The electrode is comprised of electrode sections 2 which are threaded together to form the unitized electrode. The furnace is shown as fitted with a conduit 4 for feed of phosphoric raw material another conduit 6 for removal of slag and byproducts and an overhead conduit 5 for removal of product phosphorus vapor.
Figure 2:
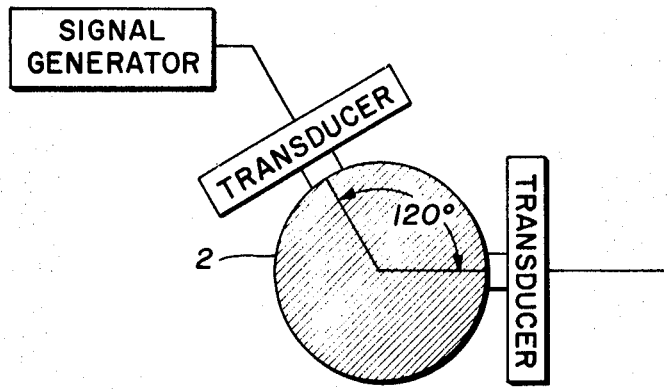
FIG. 2 is a diagrammatic representation of an electrode viewed from the top showing the arrangement of apparatus for measurement of sonic propagation velocity according to this invention. As shown, transducers are positioned on the electrode 2 at points on the electrode surface subtending at 120° angle. Impulses from a signal generator are fed to a transducer and converted to a sonic signal which is received by the other transducer. The time required for passage of the sonic impulses by the transducers is measured by conventional electronic means not shown. The invention will be better understood from the following description of the preferred embodiments.

The electrodes of this invention are of the type comprising a plurality of longitudinally contiguous electrode sections generally at least 40 inches in diameter. The critical characteristics of the electrodes of this invention which is essential to the improved performance of the electrodes is that each electrode section has a sonic propagation velocity range (as hereinafter defined) of from 5,000 to 5,900 ft./sec.

Carbon electrode sections of the type used in phosphorus furnaces are prepared by forming mixtures of anthracite coal, graphite, and coal tar pitch; molding or extruding such mixtures into substantially cylindrical shapes of desired dimension and curing the formed mixture by heat treating to a temperature of from about 850° C. to 950° C. The heating and cooling cycle generally requires 30 to 60 days. It has been discovered that commercially available electrode sections produced in this manner have sonic propagation velocities (as will hereinafter be defined) of from about 5,000 to 7,00 ft./sec. The discovery that electrodes comprised of a plurality of sections each characterized by sonic propagation velocities of from 5,000 to 5,900 ft./sec. are uniquely resistant to breakage when used in electric furnace processes is particularly unexpected in view of the fact that such electrode sections possess substantially lower intrinsic physical strength than those having higher sonic propagation velocities since it was previously considered that resistance to breakage was directly proportional to physical strength.

The phrase "sonic propagation velocity" is used in the specification and claims to denote the velocity at which sound waves of 24 kHz. frequency are propagated between points on the electrode surface circumferentially spaced by the arc distance subtending a 120° angle. The distance traveled by the sound is, of course, the distance of the chord of that arc. Measurement of sonic propagation velocity can be accomplished by locating circumferentially spaced points on the electrode corresponding to the ends of a 120° arc. An electroacoustic transducer for converting an electrical impulse to a 24 kHz. acoustic signal is placed at one of these points and a transducer for converting a received acoustic signal to an electrical signal is placed at the other point. Good acoustical couplings is ensured by the presence of a viscous liquid, such as an aqueous carboxymethyl cellulose solution between the electrode surface and the transducer faces. An electrical impulse is applied to the sound generating transducer and the time required for transversal of the first signal (the longitudinal sound wave) to the receiving transducer is measured by conventional oscilloscopic techniques. Sonic propagation velocity is routinely calculated from the data obtained. The measurements are preferably repeated at several circumferential positions for each of several longitudinal positions on each electrode section to statistically ensure that maximum and minimum sonic propagation velocities are determined.

It is to be further understood that designated of a specified sonic propagation velocity range is intended as a specification of maximum and minimum values as determined by measurements such as described above.

Also, it is to be understood that the sonic propagation velocity characteristics set forth refer to propagation ratio measured at ambient temperature prior to use of the electrode in the furnace. As previously noted, the electrodes of this invention comprise a plurality of longitudinally contiguous sections. These sections are connected by means of threaded nipples which fit sockets in the adjacent sections, or by other conventional means. It is essential that every section possess the critical characteristics described above. The advantages of the invention are not obtained when only random electrode sections possess these critical characteristics.

The invention is further illustrated by the following examples.

In these examples, elemental phosphorus is produced in an electric furnace fitted with three amorphous carbon electrodes each comprising a plurality of electrode sections 55 inches in diameter connected by nipples screwed into sockets in the ends of each electrode section, and having sonic propagation velocity characteristics as described in each example. The raw material burden fed to the furnace is a conventional feed stock comprising nodulized phosphate ore, coke and silica. The chemical composition and physical characteristics of the burden are maintained substantially constant during furnace operation. In each example, the furnace is operated continuously except for "shutdowns" required for routine maintenance, adjustment of electrode tip position, and addition of electrode sections for a period of 90 days. Electrical power of 50,000 kilovolt amperes is fed to the furnace at all times except when off-gas temperature rises to about 500° C. necessitated lowering the power to reduce temperature in order to prevent damage to the furnace. Such rises in off-gas temperature result when electrode breakage occurs which raises the position of the electrode tip, thereby reducing the distance of off-gas travel through the cooler descending feed stock. This condition cannot be corrected by adjusting electrode position since the broken portion of electrode falls to the furnace floor effectively raising its height and repositioning the electrode tip would result in an improper arc distance. Accordingly, it is necessary to operate under reduced power until the broken section of electrode is consumed or displaced from beneath the electrode tip by shifting of the furnace burden.

EXAMPLE I

The furnace is fitted with electrodes having minimum sonic propagation velocities of 5,500 ft./sec. and maximum sonic propagation velocities of 5,900 ft./sec.

These velocities are determined by measurements made every 12 inches of electrode length. At each such longitudinal position the propagation rate of sound along the chords of twelve 120° arcs circumferentially spaced by 30° is measured.

During the 90 days of phosphorus production, the off-gas temperature does not rise above 500° C. and current reduction is not required. This indicates the absence of major electrode breakage during operations.

Operation is continuous except for 2.7 days required for routine furnace maintenance and 0.45 days required for electrode position adjustment and section addition; (necessitated by normal electrode burn-off rather than breakage). 17.4 million pounds of elemental phosphorus is produced.

EXAMPLE II

For purposes of comparison, the procedure of example I is repeated with the exception that the furnace is fitted with electrodes having minimum sonic propagation velocities of 5,500 ft./sec. and maximum sonic propagation velocities of 6,500 ft./sec. Ninety-three percent of sound propagation measurements made as in Example I result in measured sonic propagation velocities of above 5,900 ft./sec. During 90 days of phosphorus production, it is necessary to reduce the current 48 times to compensate for off-gas temperature rises above 500° C. caused by electrode breakage During the 90 day period, it is necessary to maintain current at reduced levels (just sufficiently low to maintain temperatures below 500° C) for a total of 3 days. A total downtime of one day is required for electrode position adjustment and section addition. (The higher time required for this operation as compared to example I is due to the more frequent adjustments and section additions required to compensate for breakage). Downtime of 6.9 days is required for routine maintenance. This higher period of downtime, as compared to example I, is in part due to higher off-gas temperatures resulting from electrode breakage.

Phosphorous production over the 90 day period is only about 16.2 million pounds.

EXAMPLE III

The procedure of Example I is repeated with the exception that electrodes having minimum sonic propagation velocities of 5,000 ft./sec. and maximum sonic propagation velocities of 5,800 ft./sec. are utilized. Similar results are obtained.

It is seen from the foregoing examples, that the use of electrodes having sonic propagation velocities between 5,000 and 5,900 ft./sec. provide substantial advantages in elemental phosphorus production.

What is claimed is:

1. In an amorphous carbon electrode having a diameter of at least 40 inches and comprising a plurality of longitudinally contiguous sections, the improvement wherein each electrode section has a sonic propagation velocity of from 5,000 to 5,900 ft./sec., said sonic propagation velocity being the velocity at which sound waves of 24 kHz. frequency are propagated between points on the electrode surface subtending 120° angle.